Patented Jan. 3, 1939

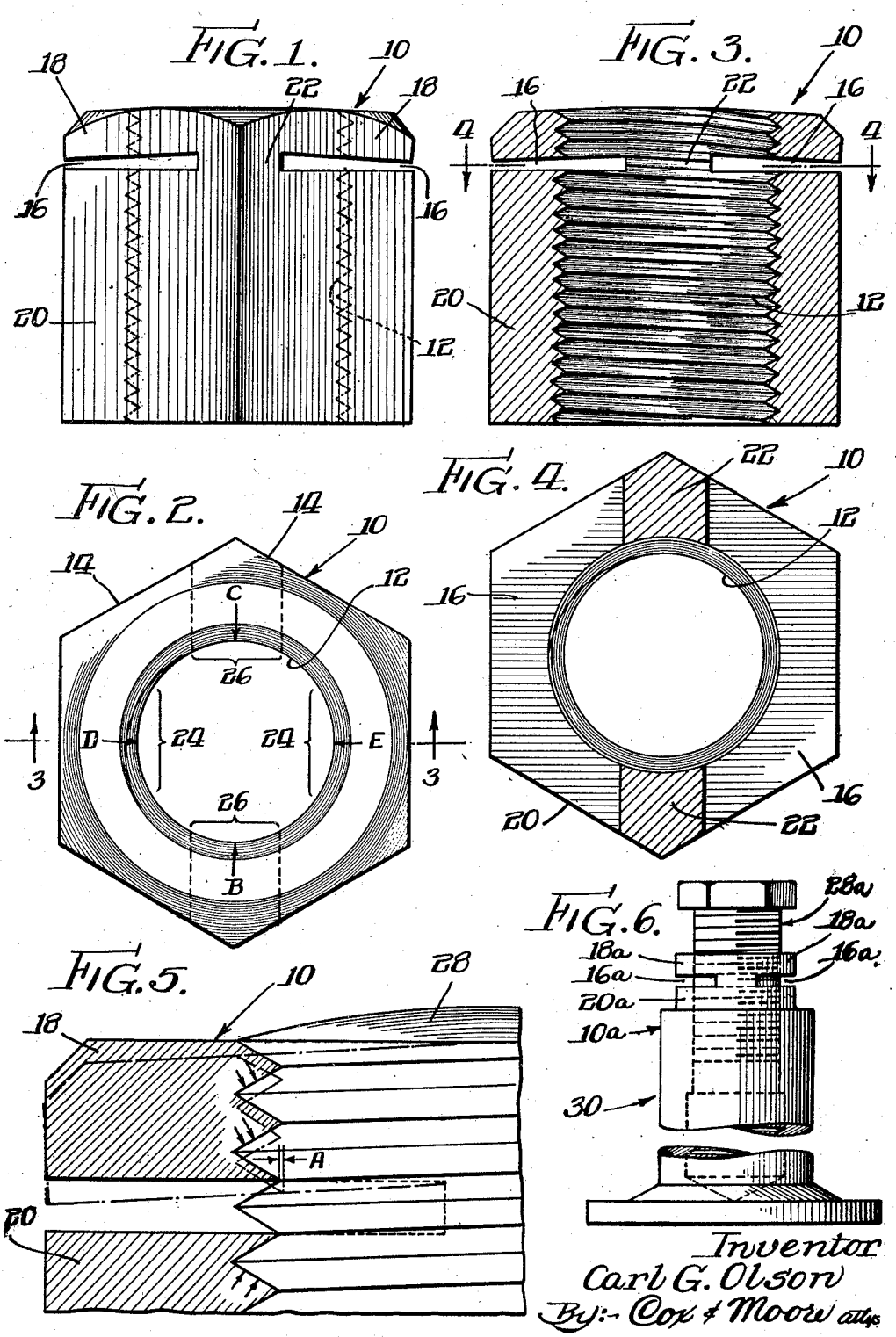

2,142,819

UNITED STATES PATENT OFFICE 2,142,819

SELF-GRIPPING DEVICE

Carl G. Olson, Chicago, Ill., assignor to Illinois Tool Works, Chicago, Ill., a corporation of Illinois Application March 23, 1936, Serial No. 70,232

2 Claims. (Cl. 151—21)

This invention relates generally to self-gripping devices, and more particularly to devices such as nuts which are self-gripping with respect to the screw thread upon which they may be applied.

It is an object of my invention to provide an internally threaded member which will serve to effectively and automatically grip the complementary thread of a screw so as to prevent unauthorized or inadvertent relative rotation of said parts.

More specifically, my invention contemplates a gripping or locking device, as set forth above, whereby a balanced frictional engagement or gripping of the screw thread may be obtained so as to increase the self-gripping efficiency of the device.

My invention also contemplates the distortion or disalinement of internal screw threads in a novel manner, whereby to accomplish the above mentioned balanced gripping action, and to this end I propose to provide a gripping device in which diametrically opposite sections of the internal screw threads are distorted.

Another object of the present invention is to provide an internally threaded gripping device, in which a portion thereof is normally distorted and another section thereof is maintained undistorted with respect to the thread helix, whereby to enhance the efficient functioning of the device when associated with a screw.

Still more specifically, the invention contemplates the provision of a rotary threaded member or nut in which diametrically disposed sections of the thread helix are normally positioned out of helical alinement so as to exert a balanced frictional grip when the nut is applied to a screw.

It is a further object of the invention to provide a device having all of the advantages enumerated above, wherein the material is distorted to an amount not in excess of the elastic limits thereof, and yet to a degree and in such a manner that the device functions more efficiently than other devices of this general type with which I am familiar.

The foregoing and numerous other objects and advantages will be more apparent from the following detailed description when considered in connection with the accompanying drawing, wherein:

Figure 1 is a side elevational view of a gripping device or nut which is representative of one embodiment of the invention;

Figure 2 is a plan view of the device shown in Figure 1;

Figure 3 is a central transverse sectional view thereof taken substantially along the line 3—3 of Figure 2;

Figure 4 is a transverse sectional view of the device taken substantially along the line 4—4 of Figure 3;

Figure 5 is an enlarged fragmentary sectional view of the nut shown in operative gripping association with a screw, the dot-and-dash lines indicating the normal position occupied by a section of the nut when it is disassociated from the screw; and Figure 6 discloses the invention as applied to a valve tappet to show that the invention is not necessarily limited to a rotary threaded member such as a nut, but is adapted for other internally threaded devices in which a screw is desired to be secured in various positions of adjustment.

Referring now to the drawing more in detail, wherein like numerals have been employed to designate similar parts throughout the various figures, it will be seen that one embodiment of my invention contemplates an internally threaded device or nut designated generally by the numeral 10. The nut is provided with the usual internal thread 12 and a sufficient number of sides 14 to enable the nut to be conveniently gripped by a turning device such as a wrench. Diametrically opposite portions of the nut are provided with recesses or slots 16. These slots or slits 16 divide the nut into sections, which I prefer to refer to as yieldable sections 18 and a rigid section 20. The slots 16 terminate short of the center of the nut body sufficiently to enable the provisioin of connecting sections 22. The slots 16 are sufficiently narrow so as to render these sections 22 relatively rigid.

The yieldable or resilient sections 18 of the nut body normally assume the deflected position shown in Figures 1 and 3. This deflection or distortion of the sections 18 toward the rigid section 20 causes portions of the thread in the yieldable sections 18, indicated by the brackets 24 of Figure 2, to normally occupy a disalined position with respect to the thread portions indicated by brackets 26 (Figure 2). Thus the portions of the thread helices in the connecting sections 22 remain in helical alinement with the thread in the rigid section 20, whereas the portions of the thread helices in the yieldable sections 18 are normally in helical disalinement with the thread in the rigid section 20 of the nut body.

When the nut 10 is applied to a complementary screw 28, it turns freely when only the thread in the rigid body section 20 engages the thread on the screw. When the distorted or disalined thread portions 24 engages the screw 28, the yieldable section 18 shift from the dot-and-dash position indicated in Figure 5 to the solid line position. This causes the thread portions 24 in the yieldable sections 18 to exert a firm frictional grip against the complementary portions of the thread in the screw 28, as indicated by the arrows in Figure 5, and also causes the thread in the rigid section 20 to exert a force in an opposite direction against the complementary thread on the screw 28, as indicated by the directional arrows in Figure 5. By having these forces acting simultaneously at diametrically opposite positions, a balanced frictional grip results. In other words, the threaded device or nut 10 is secured in position upon the screw by balanced forces acting in opposed directions on opposite sides of the screw body. This is to be clearly distinguished from gripping devices with which I am familiar wherein an unbalanced gripping effect is obtained.

Particular attention is also directed to the fact that the distortion of the yieldable sections 18 is obtained without subjecting the thread portions 26 to any helical distortion; that is to say, the helical distortion of the thread only takes place on those portions, namely, the thread portions 24 which are particularly adapted to frictionally grip the thread on the screw 28 in a balanced manner.

It might also be stated that the distortion or deflection of the yieldable sections 18 as described causes the threaded aperture extending through the sections 18 to assume a slightly elliptical form. In Figure 5 the distance indicated by the letter A shows that the deflecting of the yieldable sections 18 causes the thread portions thereof to be shifted slightly inward, as well as axially. In other words, viewing the aperture in plan as in Figure 2, the major axis of the ellipse just mentioned entends from the point indicated by the letter B to the point indicated by the letter C and the minor axis extends from D to E. In view of the fact that this lateral movement of the thread portions 24 amounts to only a few thousandths of an inch I have not attempted to indicate an elliptical form in Figure 2, but have referred to the dimension A in Figure 5 wherein the screw and nut are enlarged. It will therefore be apparent that this elliptical formation of the threaded aperture is produced by transversely and axially shifting equal portions of the diametrically disposed threads, namely the portions 24, and maintaining the diametrically disposed thread portions 26 against transverse and axial shifting.

In Figure 6 I have disclosed the manner in which my invention may be applied to a threaded member, which is not necessarily of the rotatable type such as a nut. In Figure 6 I have shown a valve tappet indicated generally by the numeral 30, which includes an internally threaded portion designated generally by the numeral 10a and an adjustable screw 28a. The internally threaded member 10a is provided with diametrically disposed slots 16a, which separate the body 10a into yieldable sections 18a and rigid section 20a. These resilient and rigid sections cooperate in the manner previously described in connection with Figures 1 to 5, inclusive. In Figure 6 the internally threaded element or member 10a serves to secure the screw 28a in various positions of adjustment by exerting the same frictional grip against the thread thereof as the nut 10 exerts against the screw 28 just described.

From the foregoing, it will be apparent that my invention contemplates an improved self-gripping device such as a nut, wherein a positive frictional grip between the complementary threads of the nut and screw is obtained. Furthermore, the self-gripping devices herein described have been scientifically designed from the standpoint of practical engineering. In other words, the device as a unit exerts a uniform balanced grip and hence is designed to render maximum gripping or locking efficiency. No unbalanced or non-uniform application of forces exists which would have a tendency to lessen the gripping effectiveness. In fact, all of the forces on one side of the device, which frictionally grip the complementary portions of the thread in the screw, act simultaneously with forces of the same degree acting in the same direction and relative location on the other side of the screw. Stating it in another way, the resilient and rigid sections of the internally threaded element exert a balanced gripping force, and the sum total of these balanced forces is infinitely greater in gripping effectiveness than the gripping forces in other conventional locking devices with which I am familiar. The above described invention may be incorporated within internally threaded elements such as nuts by the practice of simple, economical machine shop methods. The slitting of the nut at diametrically opposite positions and the subsequent disalinement of portions of the thread may be accomplished at relatively low cost and without subjecting the material to distortions in excess of its elastic limit. Furthermore, my invention enables the slotting of the internally threaded device or nut to be accomplished without impairing the strength thereof.

It will also be apparent from the foregoing description that the disalinement of the thread segments 24 is sufficiently gradual to enable the tightening approach of these thread segments and the complementary thread portions of the screw in a manner to frictionally engage without injury to the thread. Thus, one of the segments of the thread portion 24 beginning from a point of helical alinement, namely from the connecting section 22 gradually diverges from helical alinement to the point of maximum disalinement, namely the points D and E (Figure 2), and then gradually merges into helical alinement with the oppositely disposed connecting section 22. This not only affords the balanced frictional grip referred to above, but also enables the disalined thread segments on the nut to gradually move into frictional engagement with the complementary thread portions on the screw without scoring or otherwise injuring the thread helices.

The invention is not limited to the specific structures shown in the drawing, but contemplates other modifications and changes without departing from the spirit and scope of the appended claims.

Having thus described my invention, what I claim as new and desire to secure by Letters Patent is:

1. In a device of the class described an internally threaded body, said body having a plurality of recesses, said recesses being diametrically positioned and partially traversing said threaded body, internal thread portions in the vicinity of said recesses being normally positioned in relatively gradual helical disalinement with other thread portions on the body and returning to normal position when applied to a screw thread without injury thereto, whereby to enable said normally disalined thread portions to frictionally grip complementary thread portions of a screw.

2. In a device of the class described, a body provided with a conventional internal thread, a segment of said thread being yieldable and starting from a position of helical alinement, gradually diverging from helical alinement and gradually merging again into helical alinement at the opposite extremity of said segment, and a similar yieldable gradually disalined thread segment oppositely disposed from said first segment, said segments cooperating to frictionally and resiliently grip complementary thread portions of a screw which may be associated therewith, said disalinement being sufficiently gradual to permit returning to normal helical alignment when applied to a screw-thread and thereby enable the tightening approach of the disalined thread portions and complementary thread portions of the screw in a manner to frictionally engage without injury to the thread.

CARL G. OLSON.